E. P. WILLIAMS.
CORN-PLANTER.

No. 184,195. Patented Nov. 7, 1876.

Witnesses
James B. Fullerton
O. C. Ketcham

Eli P. Williams, Inventor
By
Attorney

UNITED STATES PATENT OFFICE.

ELI P. WILLIAMS, OF FARMER CITY, ILLINOIS.

IMPROVEMENT IN CORN-PLANTERS.

Specification forming part of Letters Patent No. 184,195, dated November 7, 1876; application filed September 30, 1876.

*To all whom it may concern:*

Be it known that I, ELI P. WILLIAMS, of Farmer City, in the county of De Witt and State of Illinois, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
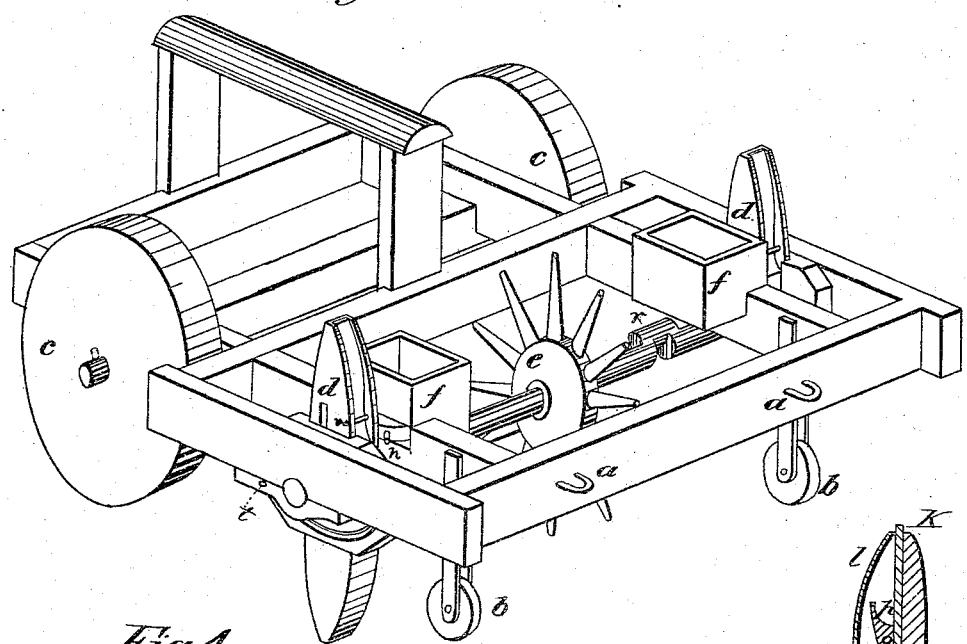
Figure 4:
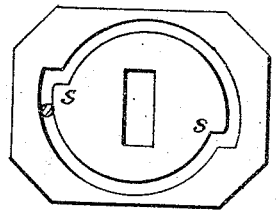
Figure 3:
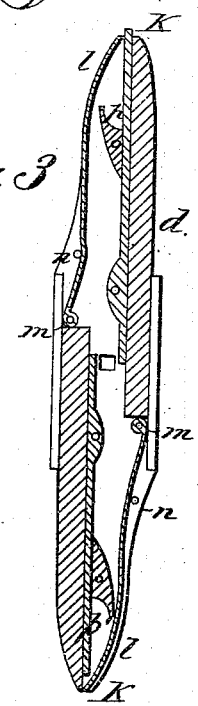
Figure 2:
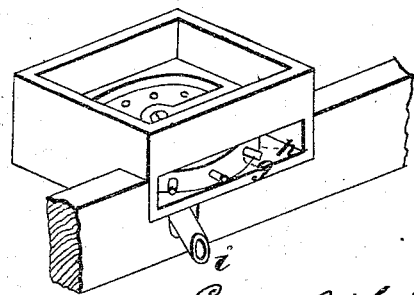
Figure 5:
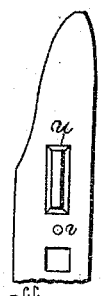

Figure 1 is a perspective view of my corn-planter. Fig. 2 is a view of the box or hopper holding the seed to be planted. Fig. 3 is a longitudinal section of the planting-tube. Fig. 4 shows the cam-disk operating the plunger within the planting-tube. Fig. 5 is a side view of the planting-tube, showing the lugs and apertures.

My invention relates to machines for planting corn by horse-power. It is so constructed as to plant two rows at one operation.

Motion is applied by attaching a pole or whiffletrees to the hooks $a\,a_1$, Fig. 1, in the front bar of the frame. The small wheels $b\,b$, being adjustable, regulate the depth at which the corn shall be planted, and the large wheels $c\,c$ serve to cover the planted corn and compress the soil, as well as support the machine. The planting-tubes $d\,d$ are carried upon the ends of a shaft, journaled upon the longitudinal and outer side bars of the machine. Upon the center of this shaft is placed a spurred wheel, $e$, the arms or spokes of which, by contact with the ground, effect the revolution of the shaft and planting-tubes. This shaft is provided also with a wrist or crank, $r$, so that the planter may be operated by a hand-lever, when preferred to the spurred wheel $e$. The corn to be planted is placed in boxes or hoppers. (Shown in Fig. 2, and at $f\,f$, Fig. 1.) On the bottoms of these hoppers are flat dropping-wheels $g$, Fig. 2, having holes or receptacles, each sufficiently large to contain one hill of corn. The upper surface of this dropping-wheel is covered by a false bottom, having in it an aperture for the passage of the corn to the receptacles, while preventing the seed from falling between the rim of the wheel and sides of the hopper. The rim of the wheel is provided with as many projections or pins $h$, Fig. 2, as there are receptacles or holes for corn. At each half-revolution of the planting-tubes these projections $h$ come in contact with lugs $u\,u$, Fig. 5, upon the inner face of the planting-tube, thereby carrying forward the dropping-wheel far enough to drop a hill of corn into a short spout, $i$, Fig. 2, connecting with apertures $v\,v$, Fig. 5, in the planting-tubes. The number of these pins and holes may be varied at pleasure. Upon the outer faces of the planting-tubes are set grooved sliding plates or cam-disks, Fig. 4, revolving with the tube. The grooves in these disks are provided with shoulders $s\,s$, Fig. 4, and pins fixed in the outer side bars of the frame or the journal-bearing $t$, Fig. 1, coming in contact with these shoulders, force the disks down at each half-revolution of the planting-tube when the lower end has entered the ground, thereby operating the plungers $k\,k$, Fig. 3. The mouths of the planting-tubes are kept closed by spring-pieces $l\,l$, having hinges $m\,m$ and pressing-bars $n\,n$. When the lower end of the planting-tube has entered the ground, the cam-disk, being caught on the shoulder in the groove by the pin in the frame, forces one of the plungers downward, pressing the spring-piece outward, and depositing the hill of corn in the ground. At the same time, and by the same motion, the other plunger is drawn within the planting-tube, and its upper mouth closed by the spring, and kept closed until that end has entered the ground. Near the mouth of the planting-tube, and within it, are provided pockets $p\,p'$. These pockets are affixed to the faces of the planting-tube, and serve to hold the hill of corn near the mouth of the tube, and in the proper position for deposit in the ground at the right moment. The pockets are so constructed with reference to the spring that no corn can pass into them, except at the moment when the spring has been forced back by the plunger, as seen at $p$, being always closed when the plunger is drawn within the tube, as at $p'$, Fig. 3. When the plunger has forced out one hill of corn, another immediately passes the pocket. The plunger being drawn within, the spring-piece closes the pocket, and holds the corn until the next revolution of the tube. It cannot fall back into the tube during the revolution. A hill of corn is thus always held in the mouth of the tube ready to be planted at the proper time; but two hills cannot get together, for the plunger must push one out before another can pass in.

I claim as of my invention, and desire to secure by Letters Patent—

1. The combination of the cam-disk with the plungers $k$ and the pin $t$, for operating said disk, as and for the purpose set forth.

2. The combination of a revolving seed-planting tube with the dropping-wheels $g$ and conveying-spout $i$, operated as herein described.

3. The cleats affixed to the sides of the tubes, and forming the pocket $p$, in combination with the spring $l$ and plungers $k$, operated by a grooved cam-disk and the pin $t$, as described, and for the purpose set forth.

In testimony that I claim the foregoing as my own I affix my signature in presence of two witnesses.

ELI P. WILLIAMS.

Witnesses:
  W. F. CALHOUN,
  JOHN B. WHITCOMB.